United States Patent [19]

Brieck

[11] 4,208,287
[45] Jun. 17, 1980

[54] OIL SPILL SKIMMER

[76] Inventor: Eugene F. Brieck, 1802 Patricia La., Apt. 2E, North Versailles, Pa. 15137

[21] Appl. No.: 47,877

[22] Filed: Jun. 12, 1979

[51] Int. Cl.² ............................................ E02B 15/04
[52] U.S. Cl. ........................ 210/242 S; 210/DIG. 25; 405/70
[58] Field of Search ................ 210/83, 242, DIG. 25; 405/63–71

[56] References Cited

U.S. PATENT DOCUMENTS

| 3,630,376 | 12/1971 | Price | 210/242 |
|---|---|---|---|
| 3,651,647 | 3/1972 | Hareni | 405/71 |
| 3,659,713 | 5/1972 | Mueller | 210/242 |
| 3,685,296 | 8/1972 | Bojasion | 405/70 |
| 3,688,506 | 9/1972 | Marcocchio | 210/242 |
| 3,706,382 | 12/1972 | Cross | 210/DIG. 25 |
| 3,730,346 | 5/1973 | Prewitt | 210/242 |
| 3,756,031 | 9/1973 | Smith et al. | 405/70 |
| 3,815,751 | 6/1974 | Pavlovic | 210/242 |
| 3,849,989 | 11/1974 | Preus | 405/70 |
| 3,923,661 | 12/1975 | Crisafulli | 210/242 S |
| 3,951,810 | 4/1976 | Crisafulli | 210/242 S |
| 4,024,063 | 5/1977 | Mori | 210/242 R |
| 4,054,525 | 10/1977 | Propp | 210/242 S |
| 4,056,472 | 11/1977 | Teasdale | 210/242 S |
| 4,065,923 | 1/1978 | Preus | 405/70 |
| 4,085,049 | 4/1978 | Hartwick | 210/242 S |
| 4,100,072 | 7/1978 | Uchida | 210/DIG. 25 |

*Primary Examiner*—Theodore A. Granger
*Attorney, Agent, or Firm*—Brown, Flick & Peckham

[57] ABSTRACT

A floating vessel is provided with an oil-receiving tank, the front of which has a horizontal sill near the top of the tank. The tank is provided with a chamber for water ballast, to which water is added or from which it is withdrawn to submerge the vessel far enough for the sill to be at oil-skimming level. Attached to opposite sides of the front of the vessel are the rear ends of forwardly diverging floating booms, the front ends of which are connected to boats that pull the booms and vessel through the water to gather oil between the booms and direct it over the sill into the tank, from which oil is pumped to a holding receptacle.

2 Claims, 7 Drawing Figures

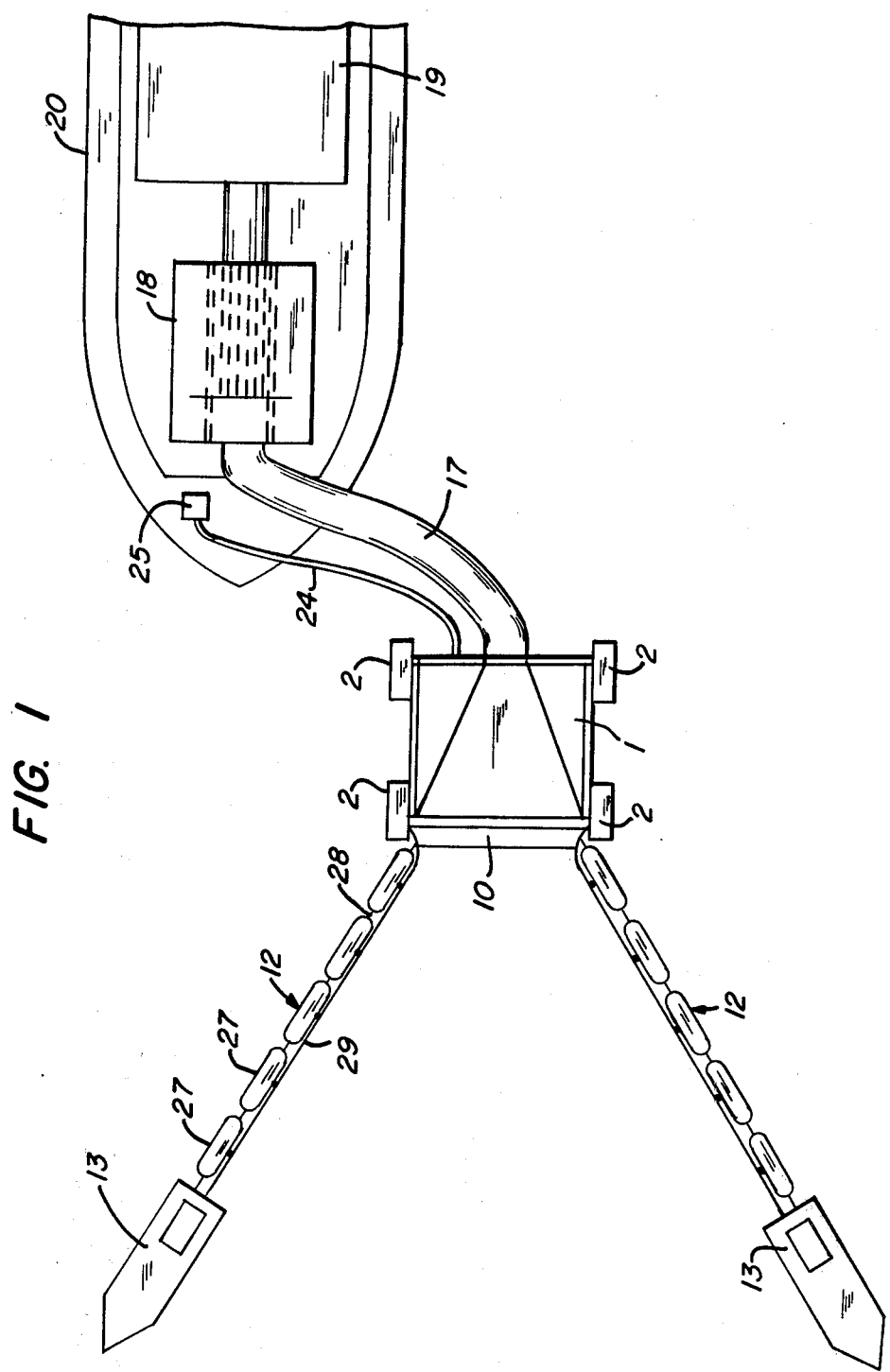

U.S. Patent Jun. 17, 1980 Sheet 2 of 3 4,208,287
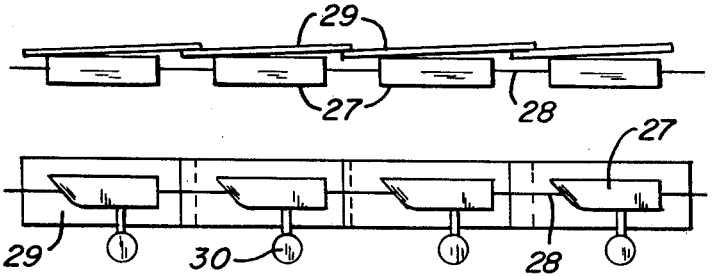
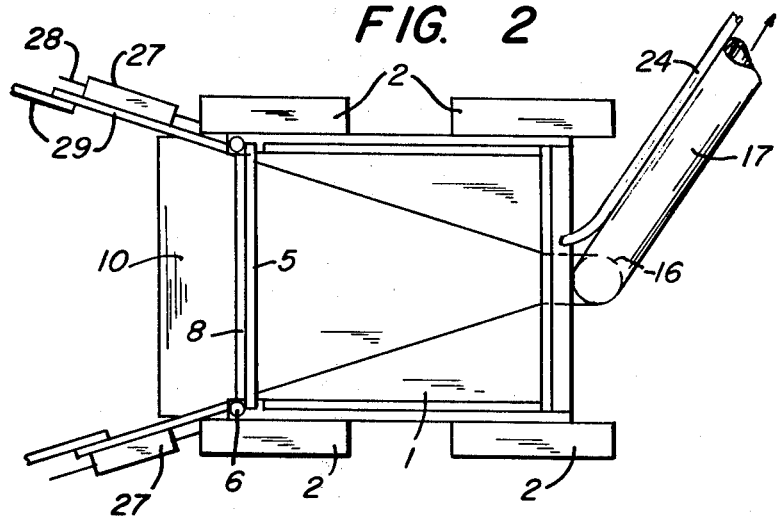
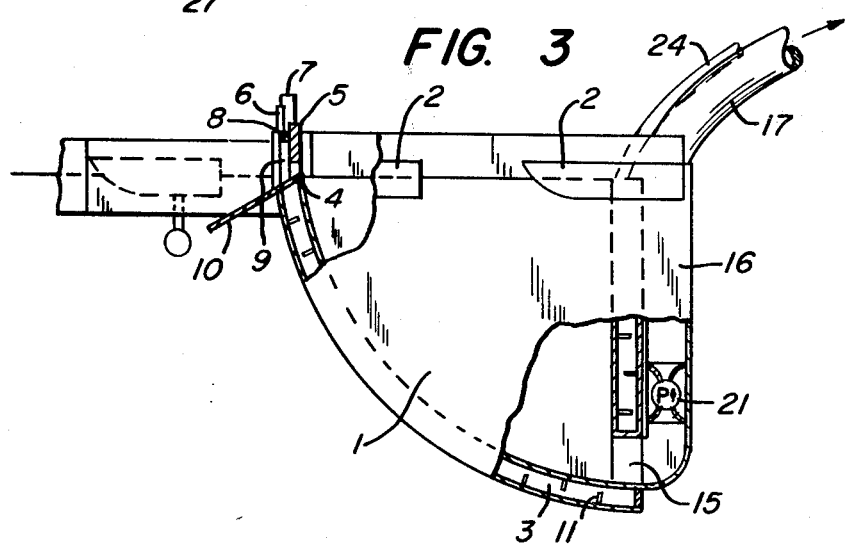

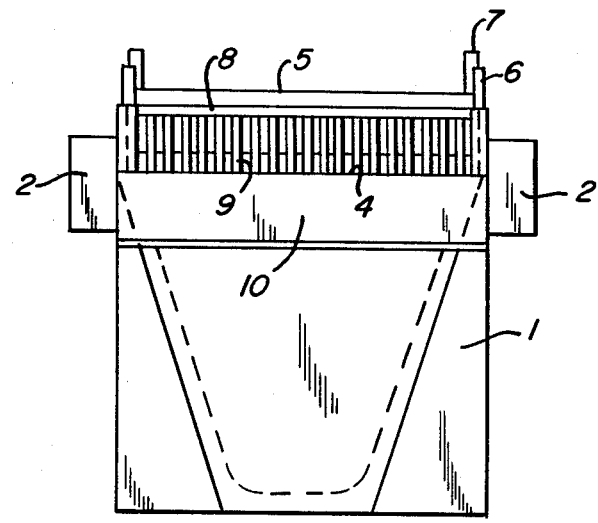
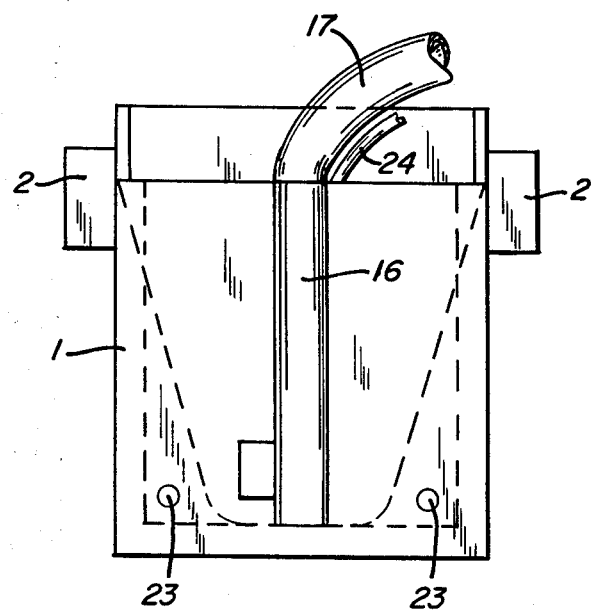

OIL SPILL SKIMMER

When oil is spilled from an oil tanker onto a body of water, or when oil escapes from a marine drilling rig onto the water, it is very important to collect as much of the spilled oil as possible in the shortest possible time. One way of doing this is to skim the oil from the surface of the water by pulling through the water a floating vessel that skims off the oil into a tank. Another way, when a current causes the water to flow in a definite direction, is to anchor the skimmer and let the water current carry the oil to it. Such a skimming vessel is provided with forwardly diverging booms, between which the oil is gathered and directed into the tank forming part of the vessel. As the oil approaches the converging ends of the booms it becomes a thicker layer, thereby reducing the percentage of water that enters the skimmer. Examples of such oil skimmers are shown in U.S. Pat. Nos. 3,659,713, 4,054,525 and 4,056,472.

It is among the objects of this invention to provide an oil spill skimmer which is an improvement on those known heretofore, which is relatively simple in construction and which is highly efficient in gathering oil spill.

The preferred embodiment of the invention is illustrated in the acompanying drawings, in which FIG. 1 is a plan view of the oil skimmer and accompanying equipment;

FIG. 2 is an enlarged and more detailed plan view of the skimming vessel;

FIG. 3 is a side view, with parts broken away in section;

FIG. 4 is a front view;

FIG. 5 is a rear view;

FIG. 6 is an enlarged fragmentary plan view of one of the booms shown in FIG. 1; and FIG. 7 is a side view of the same boom.

Referring to FIGS. 1 to 5 of the drawings, a floating vessel is formed from an oil receiving tank 1 that has a rectangular upper end and which is supported by four pontoons 2 connected to its opposite sides. The main body of the tank has inner and outer walls that form between them a chamber 3 (FIG. 3) for water ballast that keeps the vessel submerged to the desired depth. This depth is one in which a horizontal weir or sill 4, extending across the front of the tank near its top, is at oil-skimming level. Above this sill there is a gate 5 that can be raised and lowered so that the height of the space between the sill and the bottom of the gate can be adjusted. Adjustment can be made in any suitable manner, such as by air cylinders 6 mounted on the front corners of the tank and provided with vertically movable piston rods 7 that are connected to the top of the gate. To prevent floating debris of an undesired size from entering the tank, a rake is mounted in front of the gate, the rake being in the form of a horizontal cross bar 8, from which laterally spaced vertical bars 9 extend downwardly. An apron 10 extending across the front of the tank slopes downwardly from the sill. The water ballast chamber 3 is provided with baffles 11 to reduce surging of the water ballast.

Attached to the two front corners of the tank, as shown in FIG. 1, are the rear ends of a pair of booms 12 that diverge forward, with their front ends connected to suitable boats 13 by which the oil skimmer can be pulled forward through the water. As the skimmer moves forward, oil is gathered between the booms and guided back to the floating vessel, where it flows over the sill and into the tank. If there is suficient water current, the boats can be anchored and the current will carry the oil between the booms to the tank. Preferably, the front wall of the tank curves rearwardly and becomes narrower as it approaches the bottom of the tank. This helps maintain a smooth flow of oil into the tank.

The double back wall of tank 1 is provided near its bottom with an opening 15, to which the lower end of a pipe 16 is connected. The pipe extends up the outside of the tank and its upper end is connected to a flexible hose 17 leading to an oil and water separator 18 and a holding receptacle 19 in a ship 20 that travels along with the oil skimmer as shown in FIG. 1. A submersible pump 21 is mounted in the lower end of pipe 16 for pumping oil out of the tank and into the separator and holding receptacle.

In order to maintain the tank still at the desired level, which is slightly above water level, provision is made for changing the volume of ballast in the receiving tank to compensate for the changes in the weight of oil and water collected in it. This change in ballast is accomplished by providing the ballast chamber 3 with openings 23 near its bottom, preferably in the back of the tank as shown in FIG. 5, so that water can flow into and out of the ballast chamber. The direction of flow is controlled by air pressure above the water in the chamber. This is done by means of a hose 24 connected to an inlet in the top of the ballast chamber and supplied with air under pressure from a pump 25 on the accompanying ship. If it is desired to remove some of the water from the ballast chamber, more air is forced into the top of the chamber and that forces water out through openings 23. On the other hand, if it is desired to add ballast, air is vented from the air pump so that water can enter openings 23 and rise in the ballast chamber.

Another feature of this invention is the particular construction of the floating booms 12. Each boom is composed of a line of pontoons 27 that are connected end to end in spaced relation by means of cables 28 or chains. The rearmost pontoon is connected to the floating vessel, and the foremost pontoon is connected to the boat 13 at the front end of the boom. Secured to the inner side of each boom pontoon, as best shown in FIGS. 6 and 7, is a substantially vertical metal plate 29 that extends down into the water and up above the pontoon. The plate also extends in front of and behind the pontoon and overlaps the plate directly behind it. Consequently, the overlapping plates form a continuous wall for the full length of the boom. The walls of the two booms face each other and extend down into the water and far enough above it to prevent oil trapped between the booms from overflowing the walls. To prevent any tendency of the pontoons to turn on their sides and thus remove the plates from their upright position, counterweights 30 may be attached to the bottoms of the pontoons, or their bottoms can be provided with weighted keels. These flexible booms can ride the waves and prevent oil from escaping between the booms.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An oil spill skimmer comprising a floating vessel provided with an oil-receiving tank having a front and a back connected by opposite sides, the top of the tank being rectangular, the front of the tank having a horizontal sill near the top of the tank, an inclined apron extending forward and downwardly from said sill, the back and sides of the tank extending above the level of the sill, the tank having double walls forming a chamber therebetween for water ballast to submerge said vessel far enough for said sill to be at oil-skimming level during skimming, front and rear pontoons connected to each side of the tank near its top to support and stabilize the tank, the lower part of the outer wall of said chamber being provided with openings for passage of water into and out of the chamber, means for pumping air into the top of said chamber and releasing air therefrom to vary the water level in the chamber to maintain said sill at the desired oil-skimming level, the back walls of the tank being vertical and the bottom walls curving downwardly and rearwardly from said sill to the bottom of said back walls and tapering in width from front to back, the side walls of the tank sloping downwardly and inwardly from the top of the tank to the sides of the bottom walls, the lower part of the back walls at the rear end of said bottom walls being provided with an oil outlet, a pair of floating booms attached at one end to opposite sides of the front of said vessel and diverging forward therefrom, the front ends of the booms being adapted to be connected to boats for pulling the booms and said vessel through the water to gather oil between the booms and direct it over said apron and sill into said tank, an outlet pipe connected to the outer end of said oil outlet and extending up the back of the tank, a hose connected to the upper end of said pipe for delivering oil therefrom to an oil and water separator, and a pump at the lower end of the pipe.

2. An oil spill skimmer according to claim 1 in which each of said booms includes a line of longitudinally spaced pontoons, means flexibly connecting the pontoons end to end, and a substantially vertical plate secured to one side of each pontoon and extending upwardly and downwardly therefrom with each of the plates overlapping the plate behind it to form a continuous wall, the boom walls being at the inner sides of the booms, and weights suspended from said boom pontoons to hold said plates substantially upright.

* * * * *